Sept. 2, 1958 O. G. KARPALO 2,850,006
EMERGENCY CAN HEATER
Filed Dec. 2, 1955
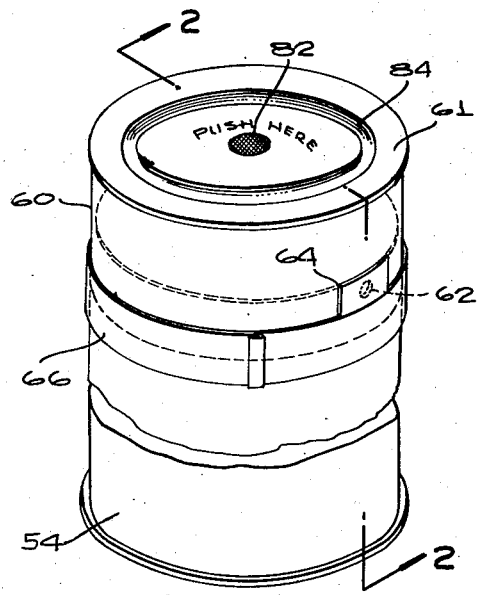
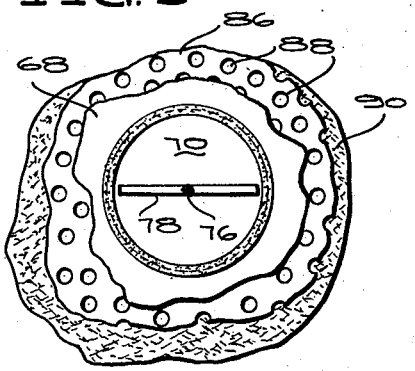
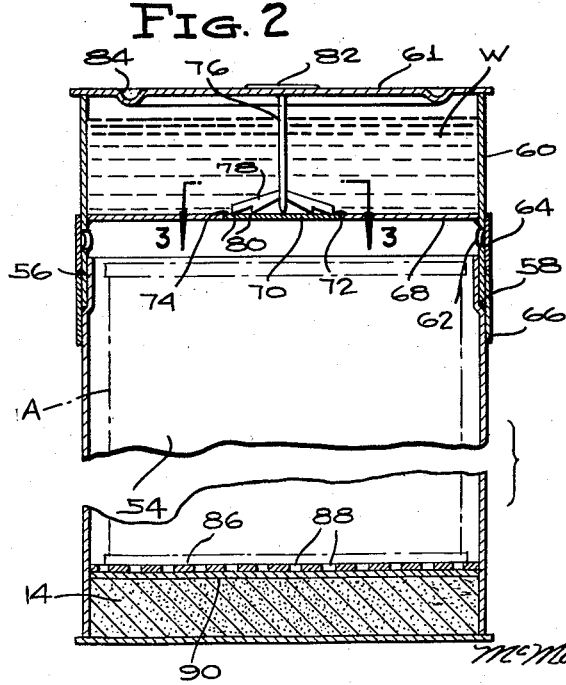
INVENTOR.
OLAUS G. KARPALO
BY
McMorrow, Berman + Davidson
ATTORNEYS

2,850,006
EMERGENCY CAN HEATER

Olaus G. Karpalo, Barcelona, Venezuela

Application December 2, 1955, Serial No. 550,746

1 Claim. (Cl. 126—262)

This invention relates to a heating device for cans or other sealed containers, and more particularly has reference to a heating device which is particularly adapted for use in emergency situations, as for example in life boats, life rafts placed in use following loss of a ship, aircraft, etc. However, as will presently appear, the device constituting the present invention need not necessarily be used only in emergency situations of this type, but rather, can be used as a device for heating food on camping trips, or during emergency situations in which domestic utilities such as electricity or gas have been shut off.

Summarized briefly, the heater constituting the present invention includes an outer container in which is adapted to be supported one or more sealed food containers, such as ordinary cans of food, and the outer container is provided, below the supported cans, with a substance that will react chemically to water to produce heat, such as quick lime (CaO), the device including means to release water for flow to the chemical substance.

The main object of the present invention is to provide a generally improved device of the type referred to, and as a more specific object in the invention, it is proposed to provide a device as stated which will be so designed as to operate efficiently during all types of weather conditions.

Another object is to provide a device of the character referred to that will be compact, simply constructed, and will be adapted to hold a substantial quantity of canned food to be heated.

Another object is to provide a heater for use in emergency and in other special situations that will be particularly designed to heat the cans with maximum rapidity, and with a minimum amount of chemicals.

Another object is to provide a device as stated which will include not only a minimum amount of chemicals, considering the amount of heat to be generated thereby, but also a minimum space for water supply, thus to leave a maximum space for the food cans and thus, also, to reduce the weight and size of the device to a minimum.

Another object is to provide a device of the character referred to in which the heating of the housed food cans will be distributed uniformly about the several surfaces of said cans.

Still another object is to provide an emergency heater of the character described, which, following heating of the housed food cans, can be swiftly disassembled to permit access to said cans.

Other objects will appear from the following description, the claim appended thereto, and from the annexed drawing, in which like reference characters designate like parts throughout the several views and wherein:

Figure 1 is a perspective view, with a part broken away, of the emergency heater;

Figure 2 is an enlarged sectional view on line 2—2 of Figure 1; and

Figure 3 is an enlarged plan sectional view on line 3—3 of Figure 2.

Referring to the drawing in detail, a cylindrical container 54 is adapted to hold a food can, not shown, and includes at its upper end a reduced extension 56 defining a circumferential shoulder 58 thereon on which seats the lower end of a cylindrical container extension 60 formed as the skirt of a flat lid 61. In the lower portion of the extension 60 there are formed circumferentially spaced escape openings 62, and these are normally sealed by tabs 64 formed upon a sealing strip 66. The sealing strip 66 extends about and seals the joint between the extension 60 and the container 54.

A flat partitioning plate 68 is fixedly secured to the inner surface of the depending skirt 60, and has a large center opening 72 which is covered by a thin, fragile plate element or disc 70, constituting a membrane. A weld of tin or the like is designated at 74 and is extended through the full periphery of element 70, securing the same sealably to the edge of the opening 72.

Extending axially of the container above the partitioning member 68 is a stem 76 to the lower end of which is secured downwardly divergent, radial arms 78 formed on their lower edges with spaced prongs 80 bearing against the disc 70. Concentric with the stem 76, on lid 61, is a painted center portion 82 of the lid, designating a location at which a force should be applied to impart downward, axial movement to the stem 76. Extending about the center portion 82 of the lid is a groove 84 formed in the material of the lid, for the purpose of permitting depression of the center portion of the lid when the device is to be used.

As shown in Figure 2, supported upon the bottom of the container 54 is a quantity of a chemical substance 14 adapted to react with water to produce heat, such substance being, for example, unslaked lime (CaO). Covering the substance 14 is a water pervious divider piece 90, and overlying this piece 90 is a container support plate 86 having perforations 88 therein. The support plate 86 is adapted to provide a support for a can of food A.

The purpose of the water-pervious divider piece is to prevent the chemical substance from shifting about within the container, as for example if the container were to be accidentally placed on its side or inverted.

In use of the device, a blow may be given the lid 61 at the location of the portion 82, by a hammer, tool, or with the hand. In this connection, water W is previously deposited within the device, in the cavity defined between plate 68 and lid 61.

Therefore, when the downward blow is given the lid, the stem 76 will be forced downwardly, and the prongs 80 will, in turn, force the disc 70 out of the opening 72, thus permitting the water to flow through the opening 72. It has been found, in this regard, that an air space should be left above the water W as shown in Figure 2 to facilitate the proper operation of the device.

The water will now flow about the housed food cans and will pass through the openings 88 and the divider 90 into the chemical substance, causing the previously mentioned chemical reaction.

It may be noted that before the downward pressure is given the center portion of the lid 61, the tabs 64 will be pulled outwardly so as to uncover the escape ports 62. A hot gas, caused by the chemical reaction between the chemical substance and the water will, accordingly, flow out of the escape ports 62 during use of the device.

After the food cans have been heated, the tape 66 is pulled off, thus permitting removal of the lid 61, depending skirt 60, and the plate 68 to permit access to the food can or cans.

It will be understood that the water in compartment 60 may be mixed with chemicals to prevent freezing, so that it will always be in condition for use. Further, other liquids besides water can be used, so long as they will produce heat when mixed with the chemical 14.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claim.

What is claimed is:

An emergency heater for canned materials comprising: an upstanding container adapted for holding a food receptacle to be heated; said container including a substance adapted to react chemically to the presence of a liquid to produce heat; a container extension on the upper end of the container, said extension including a bottom wall forming a partitioning plate between the interiors of the extension and said container, the extension adapted to contain a liquid, said container having gas outlet openings for relieving the same of vaporized liquid resulting from reaction of said substance to the liquid, the plate having a center opening; a thin, fragile plate element sealably engaged at the periphery thereof with the plate in position normally closing the opening; a stem extending axially in the extension between said bottom wall and the top wall thereof; downwardly divergent, radial arms secured to the lower end of the stem, said arms being formed on their undersides with prongs spaced radially from the stem, said prongs pointing downwardly and having lower extremities lying in a common plane normal to the axis of the stem, the prongs at their lower extremities bearing against the plate element at locations spaced radially of the axis of the plate element, the stem having an upper end affixed to the top wall of said extension, said top wall forming a lid and including a center portion and a marginal portion separated by a transversely depressed connecting portion, said center portion being depressible relative to the marginal portion to depress the stem and thereby force the prongs and said plate element downwardly, breaking the seal between said plate element and the bottom wall to release liquid into said space of the container.

References Cited in the file of this patent

UNITED STATES PATENTS

| 720,434 | Jewett | Feb. 10, 1903 |
| 827,222 | Espenhayn | July 31, 1906 |
| 1,173,454 | Nakamizo | Feb. 29, 1916 |
| 2,425,900 | Steven | Aug. 19, 1947 |
| 2,553,878 | Steven | May 22, 1951 |
| 2,559,877 | Ihle | July 10, 1951 |
| 2,596,664 | Durham | May 13, 1952 |

FOREIGN PATENTS

| 597,763 | Great Britain | Feb. 3, 1948 |
| 76,770 | Switzerland | July 1, 1918 |